(12) United States Patent
Rottengatter

(10) Patent No.: US 8,324,895 B2
(45) Date of Patent: Dec. 4, 2012

(54) MWD/LWD NMR IMAGING WITH LONG ECHO TRAINS

(75) Inventor: Peter Rottengatter, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 460 days.

(21) Appl. No.: 12/689,361

(22) Filed: Jan. 19, 2010

(65) Prior Publication Data

US 2010/0201359 A1   Aug. 12, 2010

Related U.S. Application Data

(60) Provisional application No. 61/146,820, filed on Jan. 23, 2009.

(51) Int. Cl.
G01V 3/00 (2006.01)

(52) U.S. Cl. .................................................. 324/303

(58) Field of Classification Search ........... 324/300–322
See application file for complete search history.

(56) References Cited

U.S. PATENT DOCUMENTS

| | | |
|---|---|---|
| 2,779,885 A | 1/1957 | Reynst et al. |
| 3,083,335 A | 3/1963 | Schuster |
| 3,213,357 A | 10/1965 | Brown et al. |
| 3,223,898 A | 12/1965 | Bey |
| 3,289,072 A | 11/1966 | Schuster |
| 3,483,465 A | 12/1969 | Baker, Jr. |
| 3,597,681 A | 8/1971 | Huckabay |
| 3,617,867 A | 11/1971 | Herzog |
| 3,667,035 A | 5/1972 | Slichter |
| 3,775,671 A | 11/1973 | Brown |
| 4,350,955 A | 9/1982 | Jackson et al. |
| 4,408,161 A | 10/1983 | Brown |
| 4,714,881 A | 12/1987 | Givens |
| 4,717,877 A | 1/1988 | Taicher et al. |
| 5,055,787 A | 10/1991 | Kleinberg et al. |
| 5,329,235 A * | 7/1994 | Zhou et al. ................. 324/338 |

(Continued)

FOREIGN PATENT DOCUMENTS

EP   0581666 A2   7/1993

(Continued)

OTHER PUBLICATIONS

International Search Report and Written Opinion, Mailed Aug. 31, 2010, International Appln. No. PCT/US2010/021600, Written Opinion 3 pages, International Search Report 5 pages.

(Continued)

*Primary Examiner* — Dixomara Vargas
(74) *Attorney, Agent, or Firm* — Cantor Colburn LLP

(57) ABSTRACT

An apparatus for estimating a property of an earth formation having: a plurality of receiver antennas to receive nuclear magnetic resonance (NMR) signals from a plurality of angular segments in a region of investigation in response to an interaction between a static magnetic field and pulses of electromagnetic energy; and a processor configured to: receive the NMR signals from each receiver antenna, the NMR signals having first NMR signals received from each angular segment by only one receiver antenna and second NMR signals received from a same angular segment by at least two receiver antennas; associate the first NMR signals and the second NMR signals with the angular segment from which the first NMR signals and the second NMR signals were obtained; deconvolve the second NMR signals to produce deconvolved NMR signals; and estimate the property from the first NMR signals, the deconvolved NMR signals, and the associated angular segments.

16 Claims, 5 Drawing Sheets

U.S. PATENT DOCUMENTS

| | | | |
|---|---|---|---|
| 5,389,877 A | 2/1995 | Sezginer et al. | |
| 5,459,263 A | 10/1995 | Floc'h et al. | |
| 5,488,342 A | 1/1996 | Hanley | |
| 5,610,522 A | 3/1997 | Locatelli et al. | |
| 5,646,528 A | 7/1997 | Hanley | |
| 5,705,927 A | 1/1998 | Sezginer et al. | |
| 5,757,186 A | 5/1998 | Taicher et al. | |
| 5,977,768 A | 11/1999 | Sezginer et al. | |
| 6,018,243 A | 1/2000 | Taicher et al. | |
| 6,023,164 A | 2/2000 | Prammer | |
| 6,081,116 A | 6/2000 | Wu et al. | |
| 6,163,153 A | 12/2000 | Reiderman et al. | |
| 6,173,793 B1 | 1/2001 | Thompson et al. | |
| 6,253,155 B1* | 6/2001 | Hagiwara | 702/9 |
| 6,255,817 B1 | 7/2001 | Poitzsch | |
| 6,268,726 B1 | 7/2001 | Prammer et al. | |
| 6,297,632 B1 | 10/2001 | Speier | |
| 6,326,784 B1 | 12/2001 | Ganesan et al. | |
| 6,366,088 B1* | 4/2002 | Hagiwara | 324/303 |
| 6,373,248 B1 | 4/2002 | Poitzsch | |
| 6,437,564 B1 | 8/2002 | Itskovich et al. | |
| 6,459,262 B1 | 10/2002 | Wisler et al. | |
| 6,459,263 B2 | 10/2002 | Hawkes et al. | |
| 6,559,640 B2* | 5/2003 | Taicher | 324/303 |
| 6,564,883 B2 | 5/2003 | Fredericks et al. | |
| 6,566,874 B1 | 5/2003 | Speier et al. | |
| 6,583,621 B2 | 6/2003 | Prammer et al. | |
| 6,720,765 B2 | 4/2004 | Edwards et al. | |
| 6,815,950 B2* | 11/2004 | Speier | 324/303 |
| 6,825,659 B2 | 11/2004 | Prammer et al. | |
| 6,844,728 B2 | 1/2005 | Speier et al. | |
| 6,885,943 B2* | 4/2005 | Bittar et al. | 702/7 |
| 6,891,376 B2* | 5/2005 | Hanstein et al. | 324/333 |
| 6,958,604 B2* | 10/2005 | An et al. | 324/303 |
| 7,012,426 B2 | 3/2006 | Edwards et al. | |
| 7,221,158 B1* | 5/2007 | Ramakrishnan | 324/303 |
| 7,268,547 B2 | 9/2007 | Kruspe et al. | |
| 7,283,910 B2* | 10/2007 | Hassan et al. | 702/6 |
| 7,295,005 B2 | 11/2007 | Edwards | |
| 7,405,563 B2 | 7/2008 | Kruspe et al. | |
| 7,573,026 B2* | 8/2009 | Kurkoski et al. | 250/262 |
| 7,800,372 B2 | 9/2010 | Peter et al. | |
| 7,816,921 B2 | 10/2010 | Peter et al. | |
| 7,913,557 B2 | 3/2011 | Vasques et al. | |
| 8,008,919 B2* | 8/2011 | Wang et al. | 324/346 |
| 2001/0043066 A1 | 11/2001 | Hawkes et al. | |
| 2002/0153888 A1 | 10/2002 | Kruspe et al. | |
| 2003/0132749 A1 | 7/2003 | Speier et al. | |
| 2003/0141869 A1 | 7/2003 | Prammer | |
| 2005/0030021 A1 | 2/2005 | Prammer et al. | |
| 2006/0132129 A1 | 6/2006 | Edwards | |

FOREIGN PATENT DOCUMENTS

| | | |
|---|---|---|
| EP | 0940688 A2 | 9/1999 |
| EP | 0977057 A2 | 2/2000 |
| EP | 0981062 A2 | 2/2000 |
| GB | 2359632 | 12/2001 |
| GB | 2419418 A | 4/2006 |
| WO | 9936801 | 1/1999 |
| WO | 0107937 | 1/2001 |
| WO | 03016953 A1 | 2/2003 |
| WO | 2005036208 A2 | 4/2005 |

OTHER PUBLICATIONS

International Search Report and Written Opinion, Mailed Aug. 30, 2010, International Appln. No. PCT/US2010/021599, Written Opinion 4 pages, International Search Report 5 pages.

Jay R. Porter et al.; A 16-Element Phased-Array Head Coil, 4th International Conference on Applications of Magnetic Resonance to Food Science, Sep. 7-9, 1998, pp. 272-279.

"An Improved Nuclear Magnetism Logging System and its Application to Formation Evaluation", Herrick, Couturie & Best, 1979 Annual Meeting of Society of Petroleum Engineers of AIME (SPE 8361), Sep. 23-26, 1979.

Cecil E. Hayes et al.; "Noise Correlations in Data Simultaneously Acquired from Multiple Surface Coil Arrays", Magnetic Resonance in Medicine 16, vol. 16 Issue 2, pp. 181-191, Nov. 18, 2005.

Brown, R. J. S. and G. W. Gamson. "Nuclear Magnetic Logging", Petroleum Transactions, AIME, vol. 219, Mar. 1960, pp. 199-207.

R.J. Alvarado et al., "Nuclear Magnetic Resonance Logging While Drilling," Oilfield Review (Aug. 2003). pp. 40-51.

A Timur—"Pulsed Nuclear Magnetic Resonance Studies of Porosity, Movable Fluid, and Permeability of Sandstones," Journal of Petroleum Technology, Jun. 1969, p. 775.

Fa-hsuan Lin et al.; Quantitative Spatial/Spectral Analysis of Magnetic Resonance Imaging Surface and Phased Array Coils of Arbitrary Geometry Based on Method of Moment, IEEE Transactions on Medical Imaging, vol. 18, No. 12, Dec. 1999, pp. 1129-1137.

L. J. Burnett and J. A. Jackson—"Remote (Inside-Out) NMR, II Sensitivity of NMR Detection for External Samples," Journal of Magnetic Resonance 41,406 (May 1980).

J. A. Jackson, L. J. Burnett and J. F. Harmon—"Remote (Inside-Out) NMR, III, Detection of Nuclear Magnetic Resonance in a Remotely Produced Region of Homogeneous Magnetic Field," Journal of Magnetic Resonance 41,411 (May 1980).

R. K. Cooper and J. A. Jackson—"Remote (Inside-Out) NMR. I. Remote Production of a Region of Homogeneous Magnetic Field," Journal of Magnetic Resonance, 41,400 (May 1980).

Chris D. Constantinides et al.; Signal-to-Noise Measurements in Magnitude Images from NMR Phased Arrays, Proceedings—19th International Conference-IEEE/EMBS Oct. 30-Nov. 2, 1997; pp. 456-459.

Spadea, Jennifer R. et al. "Optimization of Printed Coil Arrays for Microscopic Imaging and Spectroscopy," Proceedings—19th International Conference—IEEE/EMBS Oct. 30-Nov. 2, 1997 Chicago, IL. USA.

Brown, Jackson & Koelle, "Western Gas Sands Project Los Alamos NMR Well Logging Tool Development", Los Alamos Scientific Laboratory Report LA-10374-PR, (Mar. 1985).

* cited by examiner

MWD/LWD NMR IMAGING WITH LONG ECHO TRAINS

CROSS REFERENCE TO RELATED APPLICATIONS

This application claims the benefit of an earlier filing date from U.S. Provisional Application Ser. No. 61/146,820 filed Jan. 23, 2009, the entire disclosure of which is incorporated herein by reference.

BACKGROUND OF THE INVENTION

The invention disclosed herein relates to the field of nuclear magnetic resonance (NMR) well logging apparatus and methods. More specifically, the invention is related to acquiring and processing NMR signals to estimate a particular property of an earth formation penetrated by a borehole.

Exploration and production of hydrocarbons generally requires precise and accurate measurements of earth formations, which may contain reservoirs of the hydrocarbons. Boreholes are typically drilled into the earth formations for the exploration and production.

Well logging is a technique used to perform measurements of an earth formation penetrated by a borehole. In one embodiment, referred to as logging-while-drilling (LWD), a logging tool is used to perform the measurements during drilling operations. The logging tool is attached to a drill string having a drill bit. Thus, as the drill string rotates to turn the drill bit, the logging tool also rotates with the drill string. Because of the rotation, LWD measurements may then be averaged about the 360 degrees of rotation to produce a symmetrical picture or property of the earth formation.

Many types of measurements may be performed with the well logging technique. One type of measurement measures the response of nuclei in the earth formation to a changing magnetic field in a technique known as nuclear magnetic resonance (NMR) measurements. NMR measurements in LWD applications are usually averaged about the 360 degrees of rotation to produce a measured NMR property assumed to be symmetric around the borehole at a certain depth. However, this assumption may not be accurate. Properties of the earth formation may not be symmetric around the borehole.

Therefore, what are needed are techniques that measure NMR properties of an earth formation where the NMR properties are asymmetric about the borehole. Preferably, the techniques associate an azimuthal direction with each NMR measurement.

BRIEF SUMMARY OF THE INVENTION

Disclosed is an apparatus for estimating a property of an earth formation penetrated by a borehole, the apparatus including: a logging tool; a source of a static magnetic field, the source being disposed at the logging tool and configured to polarize a region of investigation; a transmitter antenna disposed at the logging tool and configured to transmit a train of pulses of electromagnetic energy into the region of investigation; a plurality of receiver antennas disposed at the logging tool and configured to receive nuclear magnetic resonance (NMR) signals from a plurality of angular segments in the region of investigation in response to an interaction between the static magnetic field and the pulses of electromagnetic energy; and a processor configured to: receive the NMR signals from each receiver antenna, the NMR signals having first NMR signals received from an angular segment by one receiver antenna and second NMR signals received from the angular segment by at least two receiver antennas; associate the first NMR signals and the second NMR signals with the angular segment from which the first NMR signals and the second NMR signals were obtained; deconvolve the second NMR signals to produce deconvolved NMR signals; and estimate the property from the first NMR signals, the deconvolved NMR signals, and the associated angular segments.

Also disclosed is a method for estimating a property of an earth formation penetrated by a borehole, the method including: conveying a logging tool through the borehole; generating a static magnetic field in a region of investigation in the earth formation with the logging tool, the static magnetic field being configured to polarize the region of investigation; transmitting electromagnetic energy into the region of investigation with the logging tool; receiving nuclear magnetic resonance (NMR) signals with a plurality of receiver antennas disposed at the logging tool from angular segments in the region of investigation in response to an interaction between the static magnetic field and the transmitted electromagnetic energy, the NMR signals having first NMR signals received from an angular segment by one receiver antenna and second NMR signals received from the angular segment by at least two receiver antennas; associating the first NMR signals and the second NMR signals with the angular segment from which the first NMR signals and the second NMR signals were received; deconvolving the second NMR signals to produce deconvolved NMR signals; and estimating the property from the first NMR signals, the deconvolved NMR signals, and the associated angular segments.

Further disclosed is a machine-readable medium comprising machine-executable instructions for estimating a property of an earth formation penetrated by a borehole by implementing a method including: receiving nuclear magnetic resonance (NMR) signals with a plurality of receiver antennas from a region of investigation in the earth formation comprising a plurality of angular segments, the NMR signals having first NMR signals received from an angular segment by one receiver antenna and second NMR signals received from the angular segment by two receiver antennas; associating the first NMR signals and the second NMR signals with the angular segment from which the first NMR signals and the second NMR signals were received; deconvolving the second NMR signals to produce deconvolved NMR signals; and estimating the property from the first NMR signals, the deconvolved NMR signals, and the associated angular segments.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Figure 1:
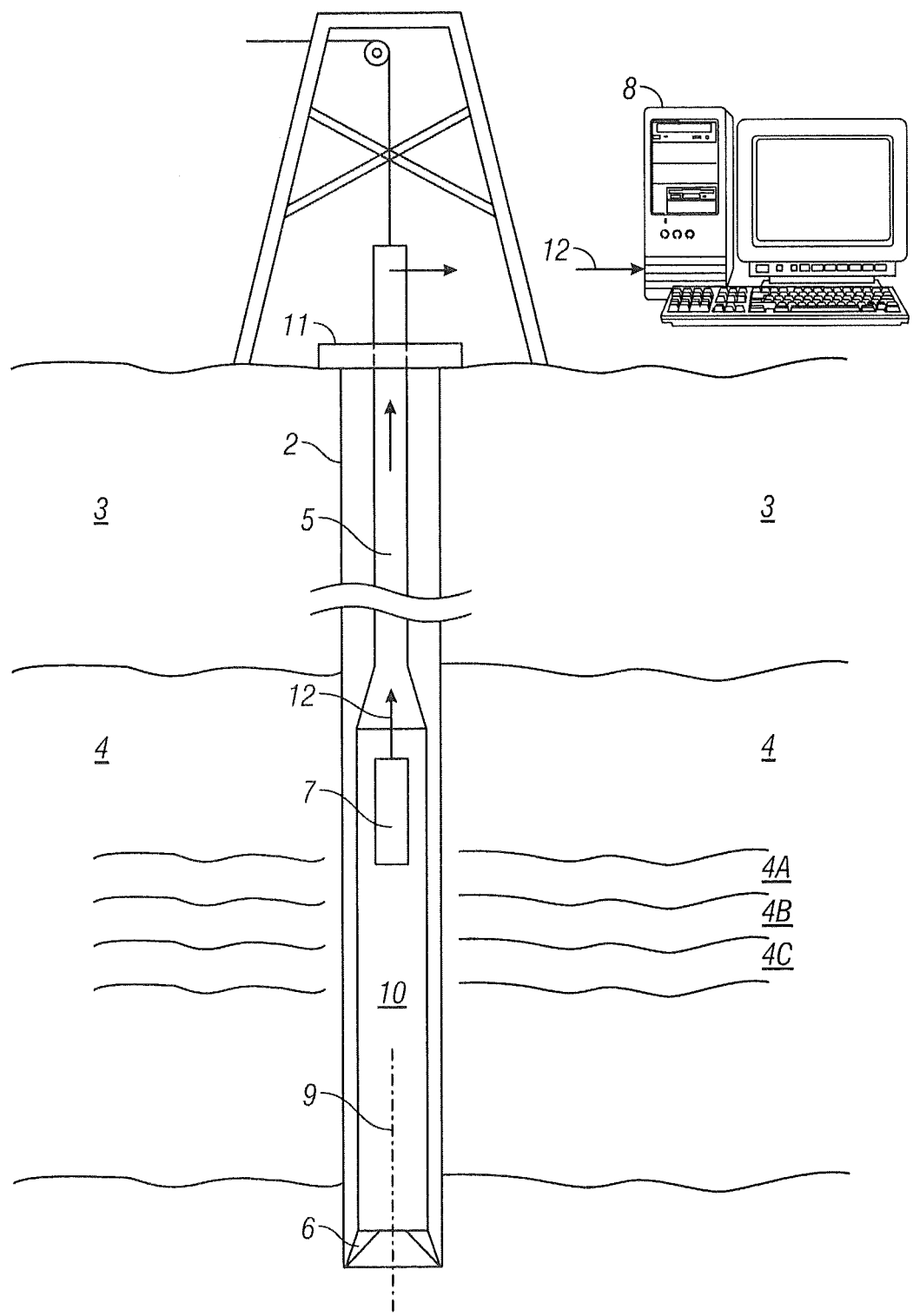
FIG. 1 illustrates an exemplary embodiment of a logging tool disposed in a borehole penetrating the earth.

Disclosed are embodiments of techniques for measuring asymmetrical nuclear magnetic resonance (NMR) properties of an earth formation penetrated by a borehole. The techniques are particularly useful for performing NMR measurements with long echo trains. The techniques disclose a logging tool for measuring the asymmetrical NMR properties and associating an azimuthal direction with the NMR measurements. In addition, the techniques also disclose a method for using the logging tool.

In one embodiment, the techniques call for performing the NMR measurements in the borehole with the logging tool coupled to a drill string. At the distal end of the drill string, a cutting device is used for drilling the borehole. Thus, as the drill string rotates turning the cutting device, the logging tool also rotates. These logging applications are referred to as "measurement-while-drilling" (MWD) or "logging-while-drilling" (LWD).

The techniques call for an NMR logging tool having at least one transmitter antenna coupled to a transmitter and a plurality of receiver antennas disposed about a circumference or perimeter of the tool. Each receiver antenna is coupled to an associated receiver, which generally includes a receiver amplifier. Each receiver antenna is configured to have a receiver field, which is perpendicular to both a static magnetic field and a magnetic field generated by the transmitter antenna in a region of investigation. The receiver field of each receiver antenna is aimed in a radial direction from the borehole into an angular segment in the region of investigation in the earth formation. Each radial direction is associated with an azimuth. Thus, associated with the NMR signals received at each receiver antenna for each region of investigation are (1) a depth in the borehole at which the NMR signals were received, (2) an angular segment having a known azimuth in the region of investigation, and (3) a radial depth or distance to the region of investigation from the borehole. With these three types of information associated with the NMR signals, an image (or visual display of NMR properties) can be created for a range of depths in the borehole. Non-limiting examples of the image include a bound fluid, porosity of the earth formation, a boundary between two layers of the earth formation, a longitudinal relaxation time constant $T_1$, and a transverse relaxation time constant $T_2$.

One advantage of the logging tool disclosed herein is that the receiver antennas are inductively decoupled from the transmitting antenna because the two antennas are oriented orthogonally to each other. This lack of direct coupling precludes the need for a decoupling transformer to cancel the voltage coupled from the transmitter antenna to the receiver antenna to avoid overloading of the associated receiver amplifier.

In one embodiment, each receiver field has an angular sensitivity range of about 70° around the circumference of the logging tool. In this embodiment, the sensitivity drops to zero just short of 90°. Accordingly, in a logging tool having four or preferably five equally spaced receiver antennas in the plurality of receiver antennas, each receiver field will overlap or meet an adjacent receiver field. When long echo trains are used for the NMR measurements, the NMR signals from an angular segment in a region of investigation may be received by two adjacent receiver antennas due to rotation of the plurality of receiver antennas at the rotating logging tool.

As one example of NMR measurements in the region of investigation using the techniques disclosed herein, consider that a long pulse train may emit 1001 radio frequency (RF) pulses of electromagnetic energy resulting in 1000 echoes (i.e., a long echo train) that are received by the plurality of receiver antennas. An echo from an angular segment of the region of investigation may be received by one or two receiver antennas, depending on whether the angular segment the NMR signals originate from is located next to a receiver antenna or in between two receiver antennas. For instance, the first few echoes in the long echo train from the angular section may be received by a first receiver antenna before the first receiver antenna rotates out of position to receive echoes from the angular segment. In turn, a second receiver antenna rotates into position to receive echoes from the same angular segment. The second receiver antenna then receives the second few echoes before rotating out of position. In turn, a third receiver antenna rotates into position to receive the next few echoes from the angular segment and so on. Accordingly, the NMR signals from the angular section due to the long pulse train must be retrieved from all the NMR signals received from all receiver antennas in the plurality of receiver antennas. In some instances, one of the echoes received by the first receiver antenna may also be received by the second receiver antenna. In addition, one of the echoes received by the second receiver antenna may also be received by the third receiver antenna and so on.

When two receiver antennas receive the same echo, the NMR signals related to that echo must be "deconvolved" from the NMR signals received by each of the antennas. That is, only one NMR measurement relating to one series of echoes (from an angular segment) is used as a measure of an NMR property. The deconvolved NMR signals provide the one NMR measurement per series of echoes.

Reference may now be had to the above long pulse train example. If the NMR signals from the two receiver antennas for the same echo are not deconvolved, then two separate measurements of the same echo from the angular segment due to one pulse will be performed. Thus, measurements of 1001 echoes from the angular segment will be performed instead of the expected 1000. If the NMR signals from the two receiver antennas for the same echo are deconvolved, then the two separate NMR signals are replaced with one deconvolved signal. Thus, 1000 expected measurements of the 1000 echoes will be performed.

For convenience, certain definitions are now presented. The term "azimuthal direction" relates to a direction that is radial to the borehole at a certain angle when viewed from along the axis of the borehole. The term "region of investigation" relates to an annular volume surrounding the borehole at a particular distance from the borehole. The term "angular segment" relates to a portion of the region of investigation. The portion may be identified by an azimuthal direction or a range of azimuthal directions. The term "NMR measurements" relates to spin-echo measurements or other nuclear induction measurements of nuclei in a material in the earth formation. In general, spin vectors of the nuclei are polarized by a static magnetic field. The nuclear spin vectors are then "tipped" from their polarized positions by a pulse of electromagnetic energy, generally in the radio frequency (RF) range, and allowed to precess and relax towards their polarized positions. The nuclei emit electromagnetic energy referred to as "NMR signals" during precession of their spins in relation to a characteristic of the earth formation. The NMR signals are measured and associated with the characteristic. The term "winding" relates to one or more turns of a conductor generally forming a coil that may be used as an antenna. When the winding has more than one turn, the winding may be referred to as a solenoid. Associated with the winding is an axis that defines the orientation of the coil. If the winding is wrapped around a cylinder, then the axis is the longitudinal axis of the cylinder. The terms "deconvolve" and "deconvolution" relate to reconstructing a signal or signals that were used as input to a measured signal. In addition to the input signals, the measured signal generally includes an error term. Deconvolution is generally implemented by a deconvolution algorithm. The deconvolution algorithm can be based on an angular position of the logging tool, time of NMR signal acquisition, amplitude of the NMR signals, frequency of NMR signals, relaxation time constant, or other criteria. Deconvolution can be performed in either a frequency domain or a time domain.

Various parameters may be selected for conducting the NMR measurements depending on a characteristic of interest in the earth formation. In addition, a sequence of the RF pulses known as Carr-Purcell-Meiboom-Gill (CPMG) spin-echo measurement sequences may be used in the NMR measurements. Non-limiting examples of these parameters include RF frequency, wait time between individual CPMG spin-echo measurements, interecho spacing time for the CPMG sequences, magnitude of the static magnetic field, and magnitude to the RF electromagnetic energy.

Various parameters of the NMR signals may be measured to estimate a characteristic of the earth formation. Non-limiting examples of these parameters include longitudinal relaxation time constant ($T_1$), transverse relaxation time constant ($T_2$), and their derivatives.

Reference may now be had to FIG. 1. FIG. 1 illustrates an exemplary embodiment of a logging tool 10 disposed in a borehole 2 penetrating the earth 3. The earth 3 includes an earth formation 4, which can include various layers 4A-4C. The logging tool 10 is configured to perform NMR measurements of the earth formation 4 from within the borehole 2. In the embodiment of FIG. 1, the logging tool 10 is configured to perform the NMR measurements during logging-while-drilling (LWD) operations. Accordingly, the logging tool 10 is attached to a drill string 5 that includes a cutting device 6. The drill string 5 is rotated by a rotating device 11. As the drill string 5 rotates to turn the cutting device 6, the logging tool 10 also rotates. For reference, the logging tool 10 has a longitudinal axis 9.

The term "formation" relates to material outside the borehole. The formation can include mud filtrate that has ingressed into the formation.

Referring to FIG. 1, an electronic unit 7 is disposed at the logging tool 10. The electronic unit 7 can be configured to operate the logging tool 10 to perform the NMR measurements or to process NMR data 12 obtained from the NMR measurements. In addition, the logging tool 10 can be configured to record the NMR data 12 for later retrieval when the logging tool 10 is removed from the borehole 2 or to transmit the NMR data 12 to a processing system 8 located at the surface of the earth 3. When transmitted to the processing system 8, the data 12 can be transmitted in real time via a high-speed telemetry system such as a wired pipe system. But other telemetry methods (e.g., mud pulsing) are possible too.

Figure 2A:
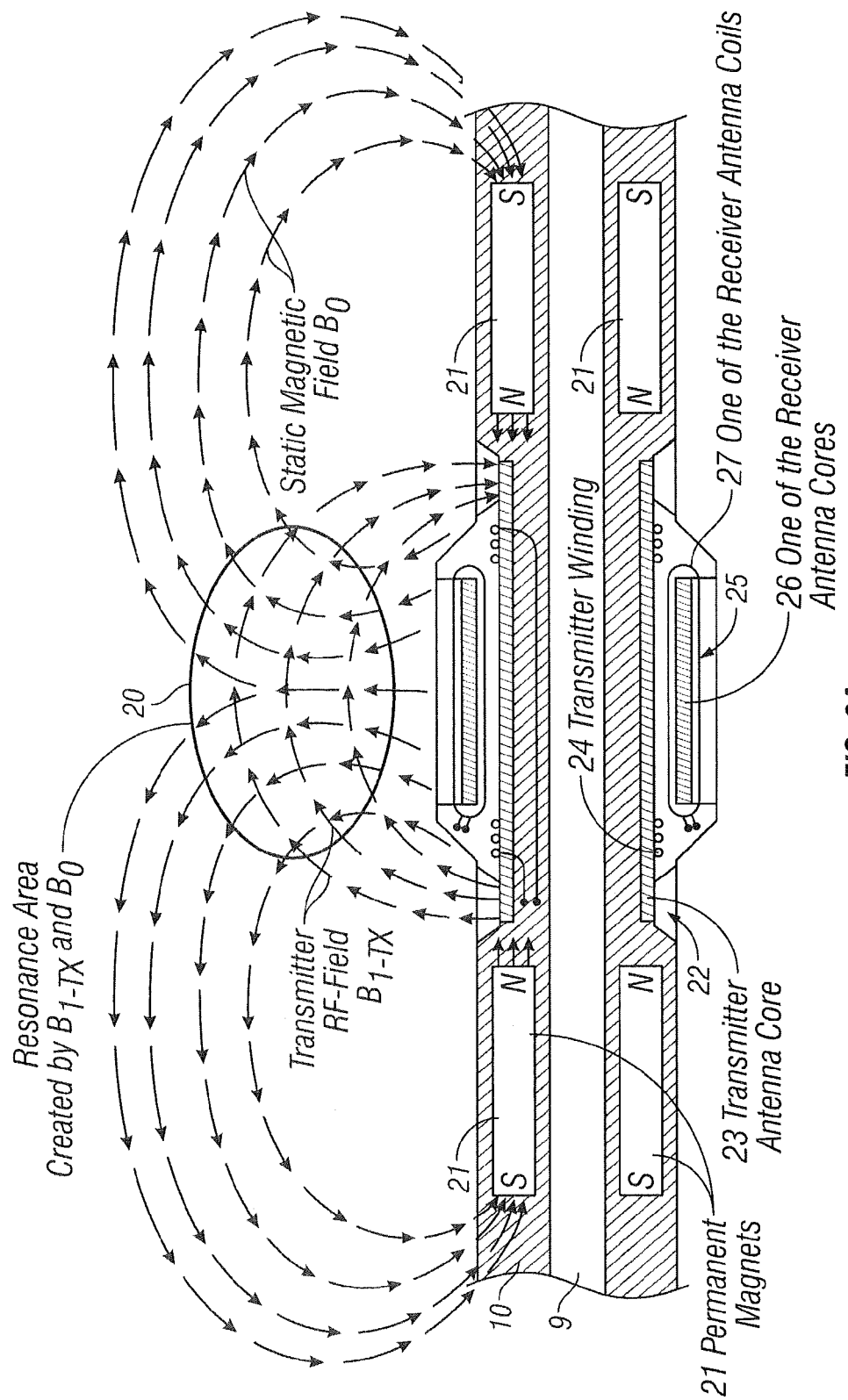
FIG. 2A and FIG. 2B, collectively referred to herein as FIG. 2, depict aspects of the logging instrument configured to perform asymmetrical nuclear magnetic resonance (NMR) measurements in a logging-while-drilling application.

FIG. 2 depicts aspects of the logging tool 10. FIG. 2A illustrates a cross-sectional side view of a section of the logging tool 10. Also illustrated in FIG. 2A is a region of investigation 20 in the earth formation 4. The region of investigation 20 is interrogated by the tool 10 to determine an NMR property and an azimuthal direction associated with the NMR property. Referring to FIG. 2A, the logging tool 10 includes a source 21 of a static magnetic field $B_0$. The static magnetic field $B_0$ in the region of investigation 20 is substantially perpendicular to the longitudinal axis 9 of the tool 10. In one embodiment, the source 21 is a permanent magnet. In another embodiment, the source 21 can be an electromagnet.

Referring to FIG. 2A, the logging tool 10 includes a transmitter 22. The transmitter 22 transmits electromagnetic energy generally in the radio frequency (RF) range into the region of investigation 20 to generate a magnetic field $B_{1-TX}$. The magnetic field $B_{1-TX}$ in the region of investigation 20 is substantially parallel to the longitudinal axis 9. The transmitter 22 in the embodiment of FIG. 2 includes a transmitter antenna core 23 and transmitter winding 24 wrapped around the transmitter antenna core 23. The transmitter antenna core 23 has a cylindrical shape that is concentric with the longitudinal axis 9. The transmitter winding 24 is disposed in a plane substantially perpendicular to the longitudinal axis 9. The transmitter winding 24 may also form one or more solenoids with their axis substantially parallel to the longitudinal axis 9.

Referring to FIG. 2A, the logging tool 10 includes a plurality of receiver antennas 25. Each receiver antenna 25 in the embodiment of FIG. 2 includes a receiver antenna core 26 and receiver antenna coil 27 wrapped around the receiver antenna core 26. The axis of the receiver antenna coil 27 is oriented as a tangent to the circumference of the logging tool 10.

Figure 2B:
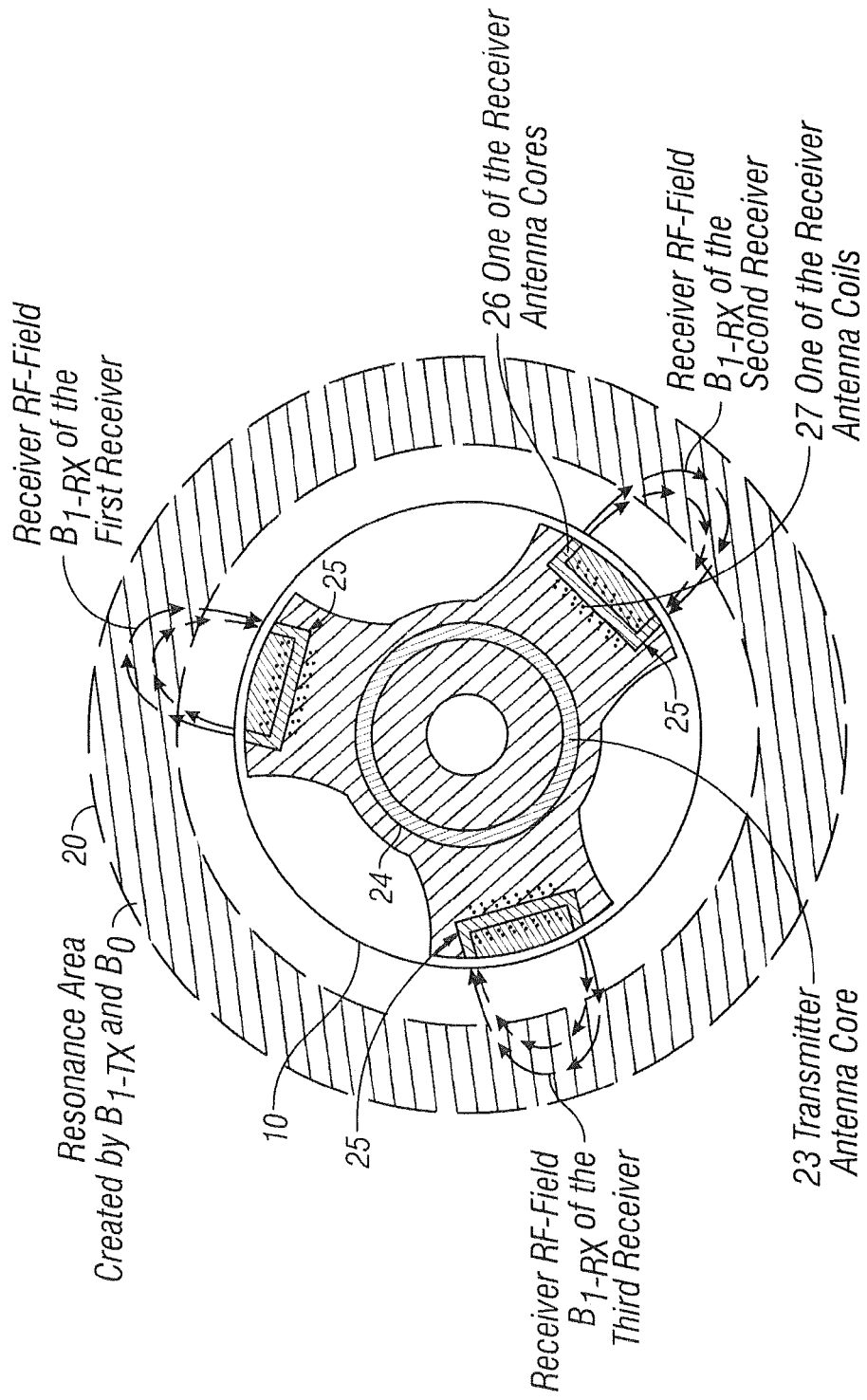

FIG. 2B illustrates a cross-sectional top view of the logging instrument 10. As shown in FIG. 2B, associated with each receiver antenna 25 is a receiver RF field $B_{1-RX}$. Each receiver RF field $B_{1-RX}$ is configured to intersect the region of investigation 20. Thus, each receiver RF field $B_{1-RX}$ is sensitive to receiving NMR signals, generally in the RF range, from the region of investigation 20. The NMR signals are in response to the static magnetic field $B_0$ and the transmitted magnetic field $B_{1-TX}$ interacting with the nuclear spins of interest in the region of investigation 20. The interaction causes tipping of the nuclear spin vectors in the region of investigation 20. The tipping in turn causes the nuclear spin vectors to precess thereby inducing the NMR signals in the receiver antennas 25. The NMR signals have at least one characteristic, such as amplitude, $T_1$ or $T_2$, related to the material composition in the region of investigation 20. Thus, by measuring the NMR signals and the azimuthal direction from which the NMR signals were received, a property of the earth formation 4 at a particular location can be determined. The azimuthal direction can be determined by recording the angular position (i.e., the azimuthal direction) of each receiver antenna 25 when each receiver antenna 25 receives the NMR signals.

Figure 3:
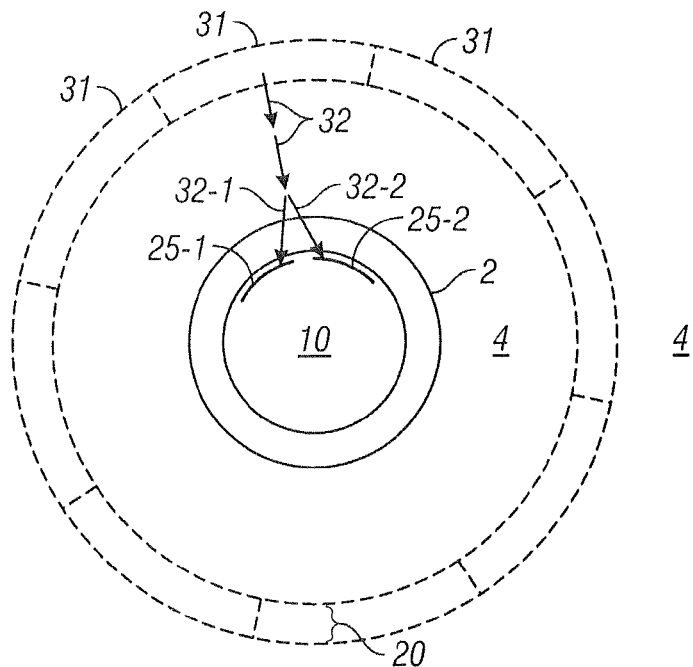
FIG. 3 depicts aspects of receiving long echo trains of nuclear magnetic resonance (NMR) signals with a plurality of receiver antennas.

FIG. 3 depicts aspects of receiving NMR signals from one angular segment in the region of investigation 20 with two receiver antennas 25. A top view of the borehole 2 is depicted in FIG. 3. Referring to FIG. 3, NMR signals 32 are emitted from an angular segment 31 in the region of region of investigation 20. The NMR signals 32 are the result of one NMR spin-echo measurement that includes polarizing the angular segment 31 with the static magnetic field $B_0$ and transmitting a pulse of electromagnetic energy, which creates the transmitted magnetic field $B_{1-TX}$ also in the angular segment 31. The NMR signals 32 are alternating magnetic fields that result from nuclei precessing in the angular segment 31 to a relaxed orientation. The NMR signals 32 are received by a first receiver antenna 25-1 and a second receiver antenna 25-2. Signals received by the first receiver antenna 25-1 and the second receiver antenna 25-2 are designated NMR signals 32-1 and NMR signals 32-2, respectively. Generally, one set of NMR signals 32 is required for processing for each NMR spin-echo measurement. A "set of NMR signals" relates to all NMR signals 32 received from one angular segment 31 for one spin-echo measurement. In general, the NMR signals 32-1 are different from the NMR signals 32-2. The differences can result from the different positions of the receiver antennas 25-1 and 25-2. The differences can also result from manufacturing differences between the antennas 25-1 and 25-2 and associated electronics such as the receiver amplifier. Thus, the NMR signals 32-1 and the NMR signals 32-2 are deconvolved by either the electronic unit 7 or the processing unit 8. The deconvolution produces deconvolved signals, which represent one set of NMR signals 32. The deconvolved signals relate to the NMR signals 32 that would be received by only one receiver antenna 25.

Figure 4A:
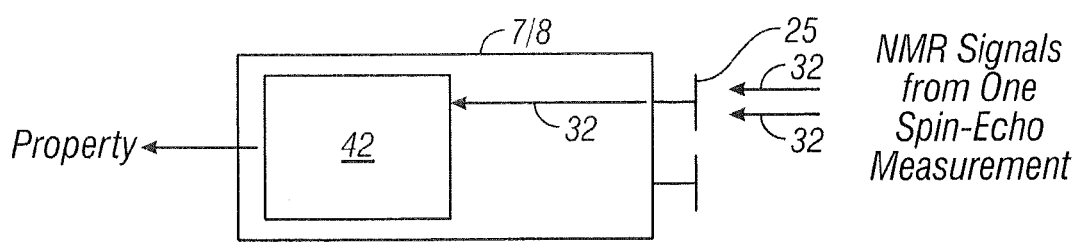
FIGS. 4A and 4B, collectively referred to as FIG. 4, depict aspects of receiving and processing NMR signals.
Figure 4B:
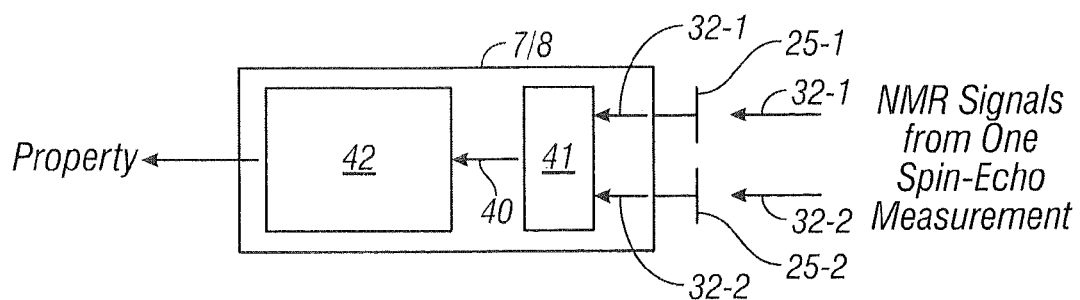

FIG. 4 depicts aspects of receiving and processing NMR signals. Referring to FIG. 4, for each NMR spin-echo measurement, either one receiver antenna 25 will receive the NMR signals 32 (referred to herein as first NMR signals) or two receiver antennas 25-1 and 25-2 will receive the NMR signals 32-1 and 32-2 (referred to herein as second NMR signals), respectively. Either the electronic unit 7 or the processing system 8 will deconvolve the second NMR signals using a deconvolution algorithm 41 to produce the deconvolved signals 40. The electronic unit 7 or the processing unit 8 can then determine the property of the earth formation 4 using the first NMR signals and the deconvolved signals 40 as input to a property algorithm 42. The property algorithm 42 is selected based upon the parameters of the NMR measurements being conducted.

Figure 5:
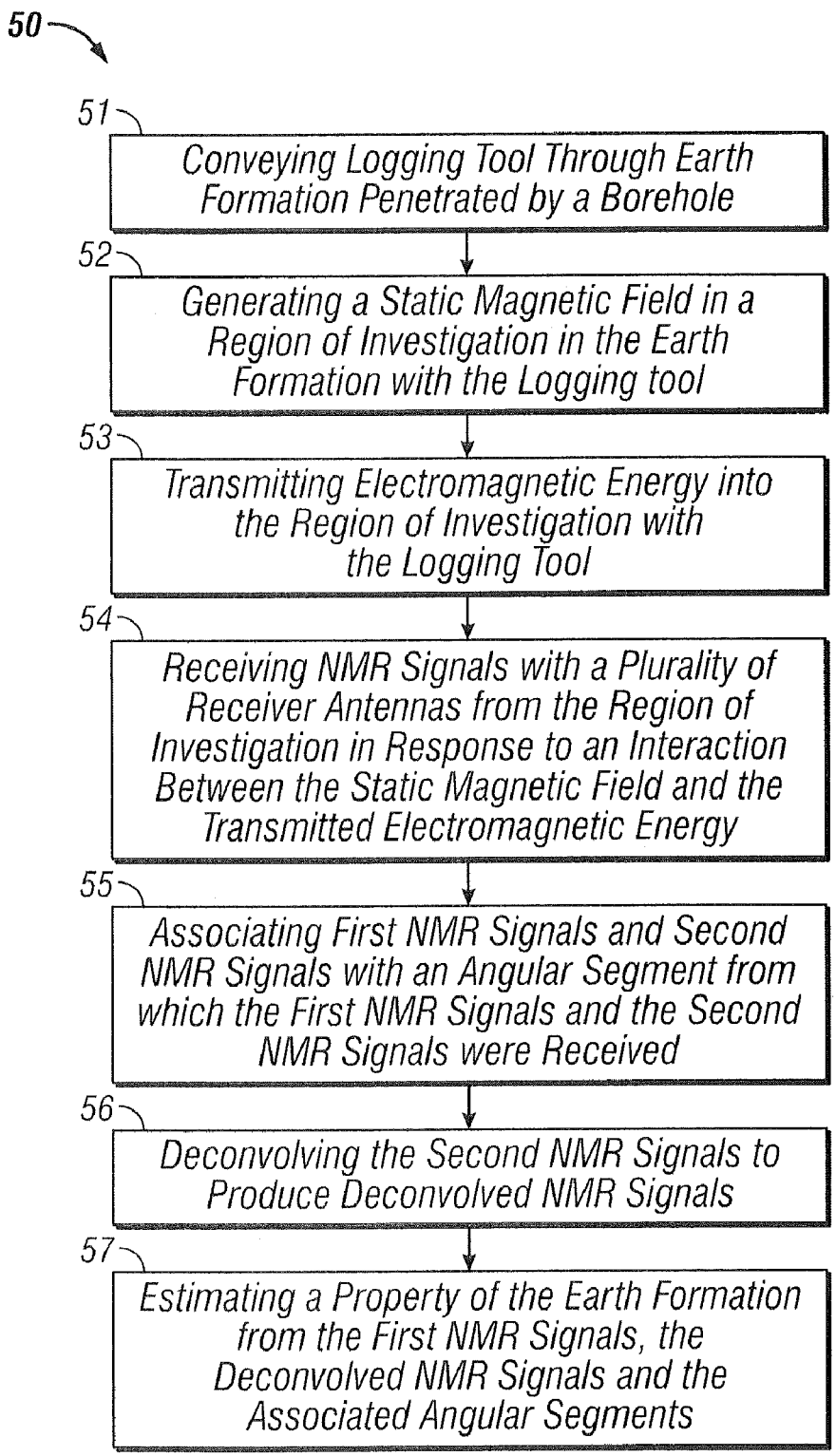
FIG. 5 presents one example of a method for estimating a property of an earth formation penetrated by the borehole.

FIG. 5 presents one example of a method 50 for estimating a property of the earth formation 4 penetrated by the borehole 2. The method 50 calls for (step 51) conveying the logging tool 10 through the borehole 2. Further, the method 50 calls for (step 52) generating the static magnetic field $B_0$ in the region of investigation 20 in the earth formation 4 with the logging tool 10, the static magnetic field $B_0$ being configured to polarize the region of investigation 20. Further, the method 50 calls for (step 53) transmitting electromagnetic energy into the region of investigation 20 with the logging tool 10. The electromagnetic energy may be transmitted as a series of CPMG pulses. Further, the method 50 calls for (step 54) receiving NMR signals 32 with the plurality receiver antennas 25 from the angular segments 31 in the region of investigation 20 in response to the interaction between nuclear spins of interest and the static magnetic field and the transmitted electromagnetic energy. In general, the NMR signals 32 are transmitted to the receiving antenna 25 by nuclear spin vectors precessing in the angular segments 31 due to the interaction. The NMR signals include first NMR signals that are received from each angular segment 31 by only one receiver antenna 25 and second NMR signals that are received from each angular segment 31 by two receiver antennas 25. Further, the method 50 calls for (step 55) associating the first NMR signals and the second NMR signals with the angular segment 31 from which the first NMR signals and the second NMR signals were received. Further, the method 50 calls for (step 56) deconvolving the second NMR signals to produce the deconvolved signals 40. The deconvolved signals 40 are associated with the same angular segment 31 from which the second NMR signals were received. Further, the method 50 calls for (step 57) estimating the property from the first NMR signals, the deconvolved NMR signals 40, and the associated angular segments 31.

While the embodiment of the logging tool 10 illustrated in FIG. 1 is configured for LWD, the logging tool 10 can also be configured for non-LWD operations. In non-LWD operations, the logging tool 10 can be configured to be conveyed by a wireline, a slickline, or coiled tubing. In one embodiment of the logging tool 10 used for non-LWD operations, the logging tool 10 can be configured to rotate the receiver antenna(s) 25 to provide 360° coverage of the borehole 2. In another embodiment of the logging tool 10 used for non-LWD operations, the logging tool 10 can have stationary receiver antennas 25 configured to provide the 360° coverage of the borehole 2.

In support of the teachings herein, various analysis components may be used, including a digital system and/or an analog system. For example, the electronic unit 7 or the processing system 8 may include the digital and/or analog system. The system(s) may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), vacuum supply, pressure supply, cooling component, heating component, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property of an earth formation penetrated by a borehole, the apparatus comprising:
a logging tool;
a source of a static magnetic field, the source being disposed at the logging tool and configured to polarize a region of investigation;
a transmitter antenna disposed at the logging tool and configured to transmit a train of pulses of electromagnetic energy into the region of investigation;
a plurality of receiver antennas disposed at the logging tool and configured to receive nuclear magnetic resonance (NMR) signals from a plurality of angular segments in the region of investigation in response to an interaction between the static magnetic field and the pulses of electromagnetic energy; and
a processor configured to:
receive the NMR signals from each receiver antenna, the NMR signals comprising first NMR signals received from an angular segment by one receiver antenna and second NMR signals received from the angular segment by at least two receiver antennas;
associate the first NMR signals and the second NMR signals with the angular segment from which the first NMR signals and the second NMR signals were obtained;
deconvolve the second NMR signals to produce deconvolved NMR signals; and
estimate the property from the first NMR signals, the deconvolved NMR signals, and the associated angular segments.

2. The apparatus of claim 1, wherein the processor is further configured to perform relaxation time constant measurements on the first NMR signals and the deconvolved NMR signals to estimate the property.

3. The apparatus of claim 1, wherein the processor is further configured to deconvolve the second NMR signals based upon at least one criteria selected from a group comprising amplitude, frequency, time of acquisition, angular position of the logging tool at the time of acquisition, decay rate, and relaxation time constant.

4. The apparatus of claim 1, wherein the processor is further configured to deconvolve the second NMR signals in a domain selected from a group comprising a frequency domain and a time domain.

5. The apparatus of claim 1, wherein the processor is further configured to associate a distance from the borehole to the angular segment from which the NMR signals were received and to include the distance in the property.

6. The apparatus of claim 1, wherein the processor is further configured to associate the NMR signals with a depth in the borehole at which the NMR signals were received and to include the depth in the property.

7. The apparatus of claim 1, wherein the processor is further configured to display the property as an image with a 360-degree representation about the borehole.

8. The apparatus of claim 7, wherein the image is at least one selection from a group comprising a bound fluid, porosity of the earth formation, a boundary between two layers of the earth formation, a longitudinal relaxation time constant $T_1$, and a transverse relaxation time constant $T_2$.

9. The apparatus of claim 1, wherein orientations of the transmitter antenna and the plurality of receiver antennas are configured to decouple the transmitter antenna from the plurality of receiver antennas.

10. The apparatus of claim 1, wherein the at least two receiver antennas are adjacent to each other.

11. The apparatus of claim 1, wherein the logging tool is configured to be conveyed by at least one of a drill string, a wireline, a slickline, and coiled tubing.

12. A method for estimating a property of an earth formation penetrated by a borehole, the method comprising:
conveying a logging tool through the borehole;
generating a static magnetic field in a region of investigation in the earth formation with the logging tool, the static magnetic field being configured to polarize the region of investigation;
transmitting electromagnetic energy into the region of investigation with the logging tool;
receiving nuclear magnetic resonance (NMR) signals with a plurality of receiver antennas disposed at the logging tool from angular segments in the region of investigation in response to an interaction between the static magnetic field and the transmitted electromagnetic energy, the NMR signals comprising first NMR signals received from an angular segment by one receiver antenna and second NMR signals received from the angular segment by at least two receiver antennas;
associating the first NMR signals and the second NMR signals with the angular segment from which the first NMR signals and the second NMR signals were received;
deconvolving the second NMR signals to produce deconvolved NMR signals; and
estimating the property from the first NMR signals, the deconvolved NMR signals, and the associated angular segments.

13. The method of claim 12, further comprising:
associating a distance from the borehole to the region of investigation from which the first NMR signals and the second NMR signals were received; and
including the distance in the property.

14. The method of claim 12, further comprising:
associating the first NMR signals and the second NMR signals with a depth in the borehole at which the first NMR signals and the second NMR signals were received; and
including the depth in the property.

15. The method of claim 12, further comprising displaying the property as an image with a 360-degree representation about the borehole.

16. A non-transitory machine-readable medium comprising machine-executable instructions for estimating a property of an earth formation penetrated by a borehole by implementing a method comprising:
receiving nuclear magnetic resonance (NMR) signals with a plurality of receiver antennas from a region of investigation in the earth formation comprising a plurality of angular segments, the NMR signals comprising first NMR signals received from an angular segment by one receiver antenna and second NMR signals received from the angular segment by two receiver antennas;
associating the first NMR signals and the second NMR signals with the angular segment from which the first NMR signals and the second NMR signals were received;
deconvolving the second NMR signals to produce deconvolved NMR signals; and
estimating the property from the first NMR signals, the deconvolved NMR signals, and the associated angular segments.

* * * * *